US011924219B1

(12) United States Patent
Campbell et al.

(10) Patent No.: US 11,924,219 B1
(45) Date of Patent: Mar. 5, 2024

(54) AGE ASSURANCE DURING AN INTERACTIVE QUERY WORKFLOW

(71) Applicant: KYC AVC UK Ltd., London (GB)

(72) Inventors: Ayrton K. Campbell, London (GB); Andrew J. Lulham, London (GB); Peter Oldal, Milton Keynes (GB); Nicholas H R M Hassell, London (GB)

(73) Assignee: KYC AVC UK Ltd., London (GB)

( * ) Notice: Subject to any disclaimer, the term of this patent is extended or adjusted under 35 U.S.C. 154(b) by 0 days.

(21) Appl. No.: 18/379,072

(22) Filed: Oct. 11, 2023

(51) Int. Cl.
  *H04L 9/40* (2022.01)
(52) U.S. Cl.
  CPC ........ *H04L 63/102* (2013.01); *H04L 63/0428* (2013.01)
(58) Field of Classification Search
  None
  See application file for complete search history.

(56) References Cited

U.S. PATENT DOCUMENTS

| | | | | |
|---|---|---|---|---|
| 2010/0004997 | A1* | 1/2010 | Mehta | G06Q 30/0269 705/14.66 |
| 2010/0046842 | A1* | 2/2010 | Conwell | G06F 18/24 382/218 |
| 2010/0082359 | A1* | 4/2010 | Chien | G06Q 30/02 705/14.66 |
| 2011/0072039 | A1 | 5/2011 | Tayloe | |
| 2011/0143811 | A1* | 6/2011 | Rodriguez | H04N 1/00244 455/556.1 |
| 2017/0032398 | A1* | 2/2017 | Li | G06F 11/0721 |
| 2018/0041335 | A1 | 2/2018 | Jakobi et al. | |
| 2019/0068608 | A1 | 2/2019 | Boland | |
| 2022/0005047 | A1 | 1/2022 | Maheshwari et al. | |

OTHER PUBLICATIONS

Allen et al., "Measurement of Age Assurance Technologies," Age Check Certification Services Ltd., 2022 https://ico.org.uk/media/about-the-ico/documents/4021822/measurement-of-age-assurance-technologies.pdf.

* cited by examiner

*Primary Examiner* — Brandon Hoffman
(74) *Attorney, Agent, or Firm* — David H. Judson

(57) ABSTRACT

A solution for efficient and secure automated age assurance checking in association with a third party workflow involving an interaction between a user having an associated email address, and a target service. A request to estimate an age of the user is received and includes the email address. In response, the system issues a query to one or more data sources, each data source being of a different type and having an age attribute associated therewith. The data source(s) return responses to the queries. The system then associates an age attribute (typically, a minimum age) to each indication received from each data source queried. Based on a frequency of occurrence of the indications and the associated age attributes, a digital footprint that includes an estimate of the individual's minimum age is derived. A response (e.g., the estimated minimum age) to the request is then returned to the third party workflow.

20 Claims, 2 Drawing Sheets

AGE ASSURANCE DURING AN INTERACTIVE QUERY WORKFLOW

BACKGROUND

Technical Field

This application relates generally to information retrieval methods and systems for age assurance checking.

Background of the Related Art

Technologies used to check the age of an Internet user are known as "age assurance." This characterization in turn is sub-divided into two categories, namely, "age verification" and "age estimation." The Working Draft of "ISO/IEC AWI 1st WD 27566 Age Assurance Systems" defines age assurance as the process of establishing, determining, and/or confirming an age determination attribute. Age estimation is defined as age determination performed using inherent features or behaviors related to a natural person. Relatedly, age verification is specified as age determination based on the validity of a credential that provides information that directly allows calculating the difference computation between the current date and the date of birth of the natural person as presented in a valid credential.

The principal purpose of age assurance is to protect children from harm when they are online. Typically these harms are considered as contact, conduct, commerce and content. Perhaps the greatest risk in this regard stems from contact, where bad actors who are adults engage with children online, and in some cases, leading to in-person contact, for nefarious purposes. The illegal purchase of age-restricted products (e.g. alcohol, vapes, offensive weapons) and exposure to adult content (e.g. violence or pornography) are other examples of these risks.

The essence of online age assurance is demonstrating age online to a requisite degree of certainty and accuracy (termed "level of assurance"), all without disclosing identity. This notion underlies the establishment of third-party age assurance providers, which are online platforms that offer the service of age assurance verification. In these known systems, users only share personally identifiable information with those providers, and not directly with the age-restricted websites they are accessing. These age assurance providers, many of whom offer both age verification and age estimation techniques, typically do not retain the personal data used to prove age, unless there is a specific legal requirement to do so, which is consistent with European data protection laws. The only information they pass on to the websites the users are accessing is "yes" or "no" in answer to a question about age e.g., "Is this user 18 or older?"

While these known systems and services provide significant advantages, there remains a need in the art to provide enhanced techniques for age assurance.

BRIEF SUMMARY

To that end, this disclosure describes a method, system and computer program product for efficient and secure automated age assurance checking in association with a third party workflow. Typically, that workflow occurs externally to the system and involves an interaction between a user having an associated email address, and a target web application or website. The web application or website has an associated age-restriction that determines whether the user's access is permissible or otherwise appropriate and should be permitted. The automated age assurance checking herein is implemented as that external third party workflow (between the user and the target web application or website) proceeds. In an example method, a request to estimate an age of the individual is received by the system. The request identifies the email address and validates the format of that address. In response to receipt of the request, the system issues a query to a set of one or more data sources, each data source being of a different type and having an age attribute associated therewith. The data source(s) themselves typically are databases that are also remote from the age assurance verification system, and the query requests an indication from the data source, namely, whether the email address has been seen in the data source. The data source(s) return responses to the query(s) in the form of one or more data points. The system then associates an age attribute (typically, a minimum age) to each indication received from each data source queried. Based on a frequency of occurrence of the indications and the associated age attributes, a digital footprint that includes an estimate of the individual's minimum age is derived A response to the request is then returned to the third party workflow, which is on-going. That response is based on the estimated minimum age derived by the age assurance verification system. Typically, the response is one of: the estimated minimum age, the estimated minimum age together with a confidence level, an estimated age bracket that includes the estimated minimum age, and a set of estimated age brackets at least one of which includes the estimated minimum age. The above-described operations are carried out programmatically, and in a secure, highly-efficient (latency-wise) and scalable manner.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

As noted above, the subject matter herein provides for an age assurance method and system. Age assurance as used herein refers to the process of establishing, determining, and/or confirming an age determination attribute, e.g., as defined in the Working Draft of "ISO/IEC AWI 1st WD 27566 Age Assurance Systems."

Figure 1:
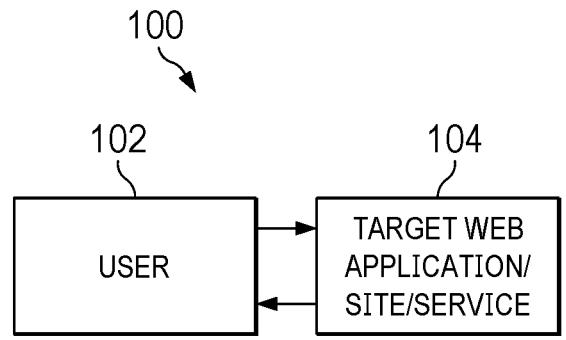
FIG. 1 depicts a third party workflow between a user and a target web application, web API or website.

By way of background, FIG. 1 depicts a third party workflow 100 between a user 102, and a target web application, web API or website (or "service") 104. The nature of the workflow 100 may vary but typically involves the user seeking to access the application or website 104 to obtain a resource (e.g., data, a web page, or access to a service provided by the target web application/site). The web application/site 104 typically is accessible over a network, such as the publicly-routed Internet. As will be described, the age assurance verification provided by the technique of this disclosure is configured to work within the context of this third party workflow 100 but at the same time preferably externally thereto. Typically, and before the user is permitted to access the target application/site, one or more authentication and authorization checks are performed.

In the third party workflow depicted, typically the user 102 interacts with the target application/site using a client computing device, such as a laptop, a desktop, a workstation, a Web-connected appliance, and the like. Most commonly, the user 102 accesses the target service 104 using a mobile device that comprises a CPU (central processing unit), computer memory, such as RAM, and a drive. The device software includes an operating system (e.g., Apple iOS, Google® Android™, or the like), and generic support applications and utilities. The device may also include a graphics processing unit (GPU). It also includes a touch-sensing device or interface configured to receive input from a user's touch and to send this information to processor. The touch-sensing device typically is a touch screen. The touch-sensing device or interface recognizes touches, as well as the position, motion and magnitude of touches on a touch sensitive surface (gestures). The device typically also comprises a high-resolution camera for capturing images (e.g., QR codes), an accelerometer, a gyroscope, and the like. Any push notification implemented in the service may be provided to the mobile device in any convenient manner, e.g., Apple Push Notification (APN) Service (APN), Google push notification services (for iOS or Android), or the like. A mobile device executes a browser, browser plug-in, or dedicated mobile app that provides a user interface, all in a known manner. Typically, the mobile device app connects to the server environment providing the "service" in a secure manner, e.g., via a TLS-secured connection, and must be authenticated (or otherwise authorized) into a user session.

The web application/site 104 is typically hosted in a back-end environment at a network-accessible location. For example, the target "service" preferably is hosted in a cloud-based environment that comprises a set of services (or components). The service may be implemented using a set of computing resources that are co-located or themselves distributed. Typically, a service is implemented in one or more computing systems. The computing platform (or portions thereof) may be implemented in a dedicated environment, in an on-premises manner, as a cloud-based architecture, or some hybrid. A typical implementation of the compute infrastructure is in a cloud-computing environment. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

Generalizing, the target application/site in the third party workflow is a technology platform that may comprise co-located hardware and software resources, or resources that are physically, logically, virtually and/or geographically distinct. Communication networks used to communicate to and from the platform services may be packet-based, non-packet based, and secure or non-secure, or some combination thereof. More generally, the cloud service comprises a set of one or more computing-related entities (systems, machines, processes, programs, libraries, functions, or the like) that together facilitate or provide the functionality described above. In a typical implementation, a representative machine on which the software executes comprises commodity hardware, an operating system, an application runtime environment, and a set of applications or processes and associated data, which provide the functionality of a given system or subsystem. The functionality of the target application/site may be implemented in a standalone machine, or across a distributed set of machines.

Figure 2:
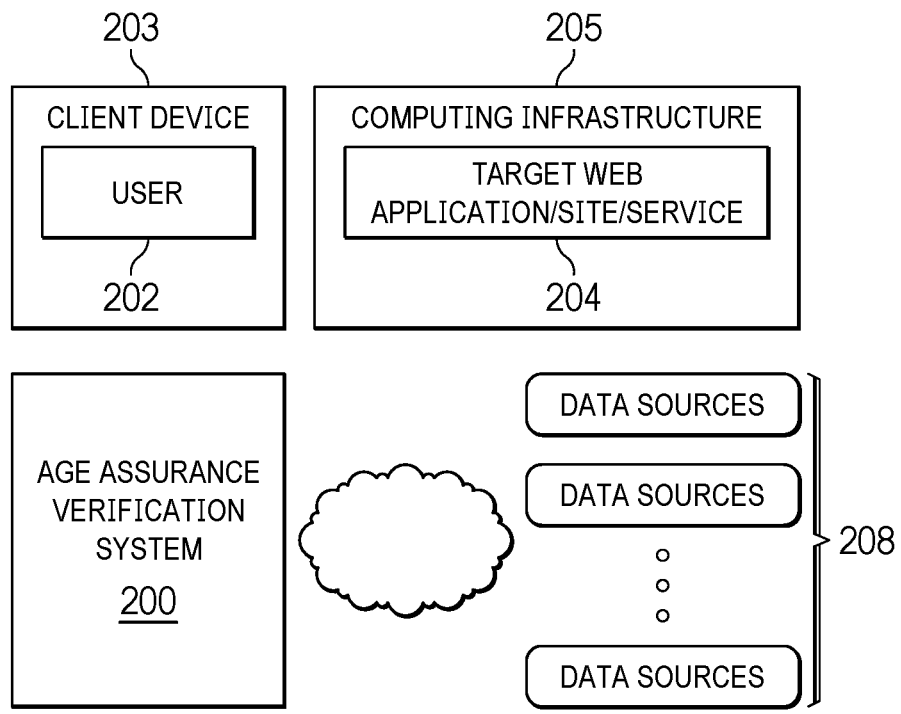
FIG. 2 depicts the technique of this disclosure wherein an age assurance system interoperates within the context of the third party workflow depicted in FIG. 1.

With the above as background, the techniques of this disclosure are now described. In this regard, FIG. 2 depicts the technique of this disclosure wherein an age assurance system 200 interoperates within the context of the third party workflow that was depicted in FIG. 1. In this example embodiment, user 202 with client device 203 is attempting to access web application/site or other protected resource 204 hosted on or otherwise associated with a computing infrastructure 205. This is the "third party workflow" referenced above. According to this disclosure, and as that workflow progresses, the age assurance system 200 is used to facilitate this access and, in particular, to provide the target service provider (or some other entity) an age assurance verification of the user. The age assurance system 200 operates at a network-accessible endpoint and is accessed during the workflow typically over an exposed application programming interface (API) 206. The system 200 itself may be hosted in a cloud computing environment (such as was described above), and typically the system 200 comprises set of one or more computing-related entities (systems, machines, processes, programs, libraries, functions, or the like) that together facilitate or provide the age assurance verification functionality. In a typical implementation, a representative machine on which the software executes comprises commodity hardware, an operating system, an application runtime environment, and a set of applications or processes and associated data, which provide the functionality of a given system or subsystem. As described, the age assurance functionality may be implemented in a standalone machine, or across a distributed set of machines, e.g., in a cloud environment such as Amazon® AWS®, Microsoft® Azure®, or the like. In a preferred embodiment, the particular age assurance verification functionality is implemented as software executed in one or more physical or virtual machines, namely, one or more computer programs held in non-transitory computer-readable medium(s) (e.g., physical drives or disks, computer memory, such as RAM, etc.)

As will be described, and as also depicted in FIG. 2, the ecosystem has associated therewith a number of network-accessible data sources 208. Typically, a data source hosts a database of information. Depending on the nature and type of the data source, the information in the database may vary, but (for purposes of this disclosure) it is assumed that the database is configured to be queried with an email address (and perhaps additional identifying information of the user). Based on the query, the data source is configured to return a response indicating whether the email address is recognized in the database. In the ecosystem depicted, there are a plurality of data sources 208, and at least some of the data sources are of different types. A data source typically is queried by the verification system over an API, or via a direct HTTP-based request-response interaction over a lightweight data exchange protocol (e.g., JSON). The decision to issue the one or more queries to the one or more data sources may be initiated in one of many ways, e.g., receipt of an HTTP redirect to the age assurance verification endpoint from the target web application or site, or some other programmatic interoperation. In operation, and in response to receiving the request from the target, the verification system queries a data source with an email address of a user and receives a response indicating whether that email address is present (or more generally has been seen) in the data source. The number of data sources queried by the age assurance verification system may vary, but typically all or substantially all of the data sources are queried.

Further, each data source has an "age attribute" associated therewith. As used herein, an "age attribute" refers to some age-related property or characteristic. A common age attribute therefore is a "minimum age" or "age range," but these examples are not limiting. As noted above, the age assurance verification system herein typically is configured to operate as the third party workflow progresses to discern the age or age range of the user seeking to access the target application/site/resource. As also explained, age verification is a subset of age assurance, and which provides higher levels of confidence in the age (e.g., 13) or age-range (less than 17, over 25, etc.) of a user. Age estimation is a subset of age assurance, but it typically provides lower levels of confidence in the age or age-range of a user.

When the age assurance system queries a data source having an associated age attribute, the information returned from this query (also referred to herein as a "data point") enables the system here to learn information that is then used to build a determination of an age attribute for the user. The one or more data sources 208 are varied, but they typically comprise at least one of: email domain analysis sites, social media sites, e-commerce sites, professional service sites, gaming, streaming and entertainment services, news and forums, credit databases, financial institutions, and travel and leisure websites. It is expected that certain data sources (e.g., gaming sites) have age attribute requirements that vary from the requirements of other data sources (e.g., social media sites). As the number of data sources is increased, the verification system (by querying these data sources with the user's email address) obtains a significant amount of data about the user's age attribute(s) as reflected in these data source(s) and the age requirements associated with the varied sources. In a representative embodiment, the number of data sources exceeds a range (e.g., 10, 25, 50, 100, 500 or more). The higher the number of data sources, the more data points are returned. One or more data sources may be associated with a single data supplier, in which case a query to the data supplier may then be used in lieu of querying each of the data supplier's data source(s). As used herein, a query to a data source thus may be done directly (as in the usual case) or indirectly (by directing the query to a data supplier responsible for multiple data sources). In the data supplier scenario, typically a single query to the data supplier results in multiple data points (corresponding to the multiple data sources associated with that supplier) being returned. Typically, the queries to the data sources occur concurrently or substantially concurrently, as the age assurance system is operating within the third party workflow and thus should return its "decision" as fast as possible (so as not to slow that workflow down). Data points returned by these queries may be cached in the age assurance verification system for subsequent re-use. As will be described, the information returned from the queries is then used by the verification system to provide a "response" to the request that was directed thereto by the target application/site/service.

The "response" returned typically is one of several types: the user's estimated minimum age, the user's estimated minimum age together with a confidence level, an estimated age bracket that includes the user's estimated minimum age, and a set of estimated age brackets at least one of which includes the user's estimated minimum age. Preferably, the target service provider determines or provisions the nature of the response when configuring the age assurance verification service.

Figure 3:
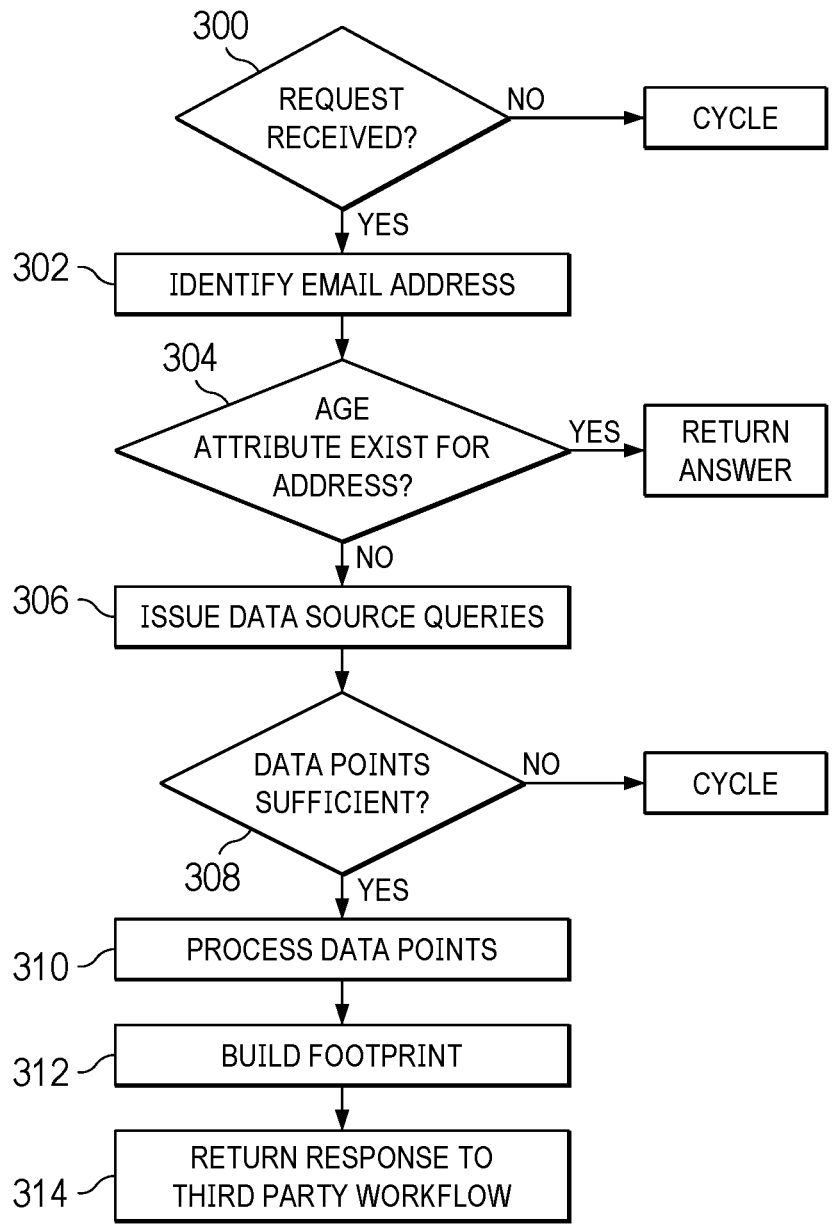
FIG. 3 depicts a representative process flow of this disclosure when the age assurance system receives a request (from the third party workflow) for an age assurance determination.

FIG. 3 depicts a representative process flow of the verification service of this disclosure.

The routine begins at step 300 to determine whether a request for age assurance checking has been received. If not, the routine cycles. As previously noted, typically the system operates in association with third party workflows. When the outcome of step 300 indicates that a request has been received, the process continues at step 302 to identify the email address at issue. At step 304, the system checks locally to see if an existing age attribute has been previously identified for the email address. If so, the system returns that age attribute in response to the request. If there is no existing information available for the email address, the process continues at step 306 with the system issuing a query to each of a set of one or more data sources and enters a wait state (for each data source) waiting for the responsive data point (or a timeout). As noted above, preferably these queries are executed concurrently. At step 308, a test is performed to determine whether all or some sufficient (configurable) number of data points have been received from the data sources that have been queried. If the outcome of step 308 is negative, the routine cycles. If, however, the outcome is positive, the routine continues at step 310 to process the data points that have been received. At this step, and using a statistical analysis of an age profile (as described below) the system associates an age attribute (typically, a minimum age) to each indication received from each data source queried. At step 312, and based on a frequency of occurrence of the indications and their associated age attributes, a digital footprint for the user based on how that user's email address has previously been used online is built/compiled, together with an estimate of the individual's minimum age. Steps 310 and 312 may be carried out together. The routine then continues at step 314 by returning to the third party workflow its response to the original request. During the above processing, the third party workflow in effect is suspended, awaiting the response from the age assurance verification check. The response returned at step 314 is based on the estimated minimum age derived by the age assurance verification system. As noted above, typically the response is one of: the estimated minimum age, the estimated minimum age together with a confidence level, an estimated age bracket that includes the estimated minimum age, and a set of estimated age brackets at least one of which includes the estimated minimum age.

Preferably, and during the above-described processing, a hash function (e.g., MD5) or other encoding is applied to the outcome of each data point to eliminate any potential risk of revealing user information.

In a representative embodiment, step 312 involves executing a statistical analysis on the digital footprint to build an age profile, and this profile enables the system to estimate the minimum age. Without intending to be limiting, different data points may be prescribed different ratings for specific ages and that, in turn, give an overall rating toward an age category. In one embodiment, the logic attributes different ages, age ranges and levels of certainty to the data points, and a threshold has to be met for the system to pass someone as 18+.

While the techniques herein preferably leverage statistical analysis as described above, the system may also leverage machine learning algorithms to generate the age assurance decision(s).

The above-described operations are carried out programmatically, and in a secure, highly-efficient (latency-wise) and scalable manner, as a processing goal of the service is the return of a response as fast as possible so as to not slowdown the third party workflow. For scalability, preferably the application is hosted (e.g., in Kubernetes) in a public cloud provider. Regarding security, preferably all data (the queries, the data point indications, and the response) are encrypted at rest and in transit using a combination of 256-bit encryption and hashing algorithms. As noted above, a hash function (or other encoding) is applied to the outcome of each data point query to eliminate risk of revealing user information. Generalizing, the digital footprint here is generated under one or more cryptographic protocols that secure the email address and the data obtained from the data sources.

Although not required, there may be circumstances where it is desired for the system to check with the user before returning the response. In such a case, and before step 314 in FIG. 3, the system issues a one-time request typically to the user (or his/her designee or surrogate) to confirm that the email address is associated to that individual. This one-time request may be carried out over one or more communications channels (typically via a push notification, but other options such as email or a telephone call may be used). This operation enables the system to verify the individual's ownership of the email address and removes the risk of individuals using another person's email address to misrepresent their age. In this variant embodiment, the response to the request (step 314) is only returned upon receiving an affirmative response to the one-time request.

The above-described technique provides significant advantages. In particular, the email methodology is very convenient and has a minimal impact on the user's experience at the target site (low friction). Indeed, if the web site requires an email address from its users already for account creation purposes, there need only be a change to the site's privacy policy or, if legally required, a request for consent to use that email address as the basis of an age check. Because almost all users of the Internet have an email address, the described method is broadly inclusive and completely unbiased (high coverage). It is equally accessible by all sexes, ethnicities and social-demographics, and it does not require a user to own an identity document, a smartphone or webcam, or share an image of their face, which in itself can be a culturally sensitive issue. Further, the approach herein is highly flexible from an implementation standpoint, as the email address age assurance method can be triggered in multiple ways, typically by a third party providing the system with a user's email address for age assurance purposes via a secure API, but also possibly by an end user manually inputting his or her email address into the system explicitly for the purpose of age assurance. Using the data points returned, the system builds the detailed digital footprint for the user based on how that user's email address has previously been used online, e.g., across financial institutions, online gaming, social media accounts, utility providers, and so forth. The solution is highly accurate, and operates at high speed, e.g., returning a response is less than a few seconds.

Other Enabling Technologies

Typically, the computing platform that provides age assurance verification is managed and operated "as-a-service" by a service provider entity. In one embodiment, the platform is accessible over the publicly-routed Internet at a particular domain, or sub-domain. The platform is a securely-connected infrastructure (typically via SSL/TLS connections), and that infrastructure includes data encrypted at rest, e.g., in an encrypted database, and in transit. The computing platform typically comprises a set of applications implemented as network-accessible services. One or more applications (services) may be combined with one another. An application (service) may be implemented using a set of computing resources that are co-located or themselves distributed. Typically, an application is implemented using one or more computing systems. The computing platform (or portions thereof) may be implemented in a dedicated environment, in an on-premises manner, as a cloud-based architecture, or some hybrid.

The system may be implemented on-premises (e.g., in an enterprise network), in a cloud computing environment, or in a hybrid infrastructure. An individual end user typically accesses the system using a user application executing on a computing device (e.g., mobile phone, tablet, laptop or desktop computer, Internet-connected appliance, etc.). In a typical use case, a user application is a mobile application (app) that a user obtains from a publicly-available source, such as a mobile application storefront. The platform may be managed and operated by a service provider. Although typically the platform is network-accessible, e.g., via the publicly-routed Internet, the computing system may be implemented in a standalone or on-premises manner. In addition, one or more of the identified components may interoperate with some other enterprise computing system or application.

One or more functions of the computing platform of this disclosure may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a standalone machine, or across a distributed set of machines.

Typically, but without limitation, a client device is a mobile device, such as a smartphone, tablet, or wearable computing device, laptop or desktop. A typical mobile device comprises a CPU (central processing unit), computer memory, such as RAM, and a drive. The device software includes an operating system (e.g., Google® Android™, or the like), and generic support applications and utilities. The device may also include a graphics processing unit (GPU). The mobile device also includes a touch-sensing device or interface configured to receive input from a user's touch and to send this information to a processor. The touch-sensing device typically is a touch screen. The mobile device comprises suitable programming to facilitate gesture-based control, in a manner that is known in the art.

Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Each above-described process preferably is implemented in computer software as a set of program instructions executable in one or more processors, as a special-purpose machine.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

The functionality may be implemented with other application layer protocols besides HTTP/HTTPS, or any other protocol having similar operating characteristics.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

Each above-described process preferably is implemented in computer software as a set of program instructions executable in one or more processors, as a special-purpose machine.

The techniques herein generally provide for the above-described improvements to a technology or technical field, as well as the specific technological improvements to various fields, all as described above.

In a variant embodiment, the age assurance workflow as described herein is directly associated with the web application/site (instead of being external thereto), and the age assurance workflow as described herein is carried out (e.g., in association with other authentication and authorization checking) as part of the direct end user access.

carried out within an associated end user access to a target web application/site, and wherein the verification system is directly associated with the web application/site.

What is claimed follows below.

The invention claimed is:

1. A method associated with a third party workflow involving an individual having an email address, comprising:
as the third party workflow proceeds:
receiving a request to estimate an age of the individual, the request identifying the email address;
responsive to receipt of the request, issuing a query to a set of one or more data sources, each data source being of a different type and having an age attribute associated therewith, the query requesting an indication whether the email address has been seen in the data source;
responsive to receipt of one or more data points from the set of one or more data sources, associating an age attribute to each indication received;
based on a frequency of occurrence of the indications and the associated age attributes, building a digital footprint that includes an estimate of a minimum age of the individual; and
returning to the third party workflow a response to the request based on the estimated minimum age.

2. The method as described in claim 1 wherein the response is one of: the estimated minimum age, the estimated minimum age together with a confidence level, an estimated age bracket that includes the estimated minimum age, and a set of estimated age brackets at least one of which includes the estimated minimum age.

3. The method as described in claim 1 wherein the request is received from the third party workflow programmatically.

4. The method as described in claim 1 further including determining whether estimating a minimum age associated with the individual is possible.

5. The method as described in claim 1 delivered as software-as-a-service.

6. The method as described in claim 1, wherein the digital footprint is generated under one or more cryptographic protocols that secure the email address and the data obtained from the data sources.

7. The method as described in claim 6, wherein the cryptographic protocols include data hashing and encryption in transit.

8. The method as described in claim 1 further including issuing a one-time request to the individual to confirm that the email address is associated to the individual.

9. The method as described in claim 8 wherein the response to the request to estimate the age of the individual is returned upon receiving an affirmative response to the one-time request.

10. The method as described in claim 1 wherein the one or more data sources comprise at least one of: email domain analysis sites, social media sites, e-commerce sites, professional service sites, gaming, streaming and entertainment services, news and forums, credit databases, financial institutions, and travel and leisure websites.

11. The method as described in claim 10 wherein a number of interrogated data sources exceeds 100.

12. A Software-As-A-Service (SaaS) apparatus, comprising:
   computer hardware comprising at least one hardware processor; and
   computer memory holding computer software executed by the at least one hardware processor, the computer software configured to execute in association with and as a third party workflow proceeds, the third party workflow involving an individual having an email address, the computer software comprising program code configured to:
      receive a request to estimate an age of the individual, the request identifying the email address;
      responsive to receipt of the request, issue a query to a set of one or more data sources, each data source being of a different type and having an age attribute associated therewith, the query requesting an indication whether the email address has been seen in the data source;
      responsive to receipt of one or more data points from the set of one or more data sources, associate an age attribute to each indication received;
      based on a frequency of occurrence of the indications and the associated age attributes, build a digital footprint that includes an estimate of a minimum age of the individual; and
      return to the third party workflow a response to the request based on the estimated minimum age.

13. The apparatus as described in claim 12 wherein the response is one of: the estimated minimum age, the estimated minimum age together with a confidence level, an estimated age bracket that includes the estimated minimum age, and a set of estimated age brackets at least one of which includes the estimated minimum age.

14. The apparatus as described in claim 12 wherein the request is received from the third party workflow programmatically.

15. The apparatus as described in claim 12 wherein the program code is further configured to include program code that determines whether estimating a minimum age associated with the individual is possible.

16. The apparatus as described in claim 12 wherein the program is further configured to issue a one-time request to the individual to confirm that the email address is associated to the individual.

17. The apparatus as described in claim 16 wherein the response to the request is returned to the third party workflow upon receiving an affirmative response to the one-time request.

18. The apparatus as described in claim 12 wherein the one or more data sources comprise at least one of: email domain analysis sites, social media sites, e-commerce sites, professional service sites, gaming, streaming and entertainment services, news and forums, credit databases, financial institutions, and travel and leisure websites.

19. The apparatus as described in claim 18 wherein a number of interrogated data sources exceeds 100.

20. A computer program product in a non-transitory computer-readable medium for use in a data processing system, the computer program product holding computer program instructions that, when executed by the data processing system in association with and as a third party workflow proceeds, the third party workflow involving an individual having an email address, are configured to:
   receive a request to estimate an age of the individual, the request identifying the email address;
   responsive to receipt of the request, issue a query to a set of one or more data sources, each data source being of a different type and having an age attribute associated therewith, the query requesting an indication whether the email address has been seen in the data source;
   responsive to receipt of one or more data points from the set of one or more data sources, associate an age attribute to each indication received;
   based on a frequency of occurrence of the indications and the associated age attributes, build a digital footprint that includes an estimate of a minimum age of the individual; and
   return to the third party workflow a response to the request based on the estimated minimum age.

* * * * *